Patented Apr. 3, 1928.

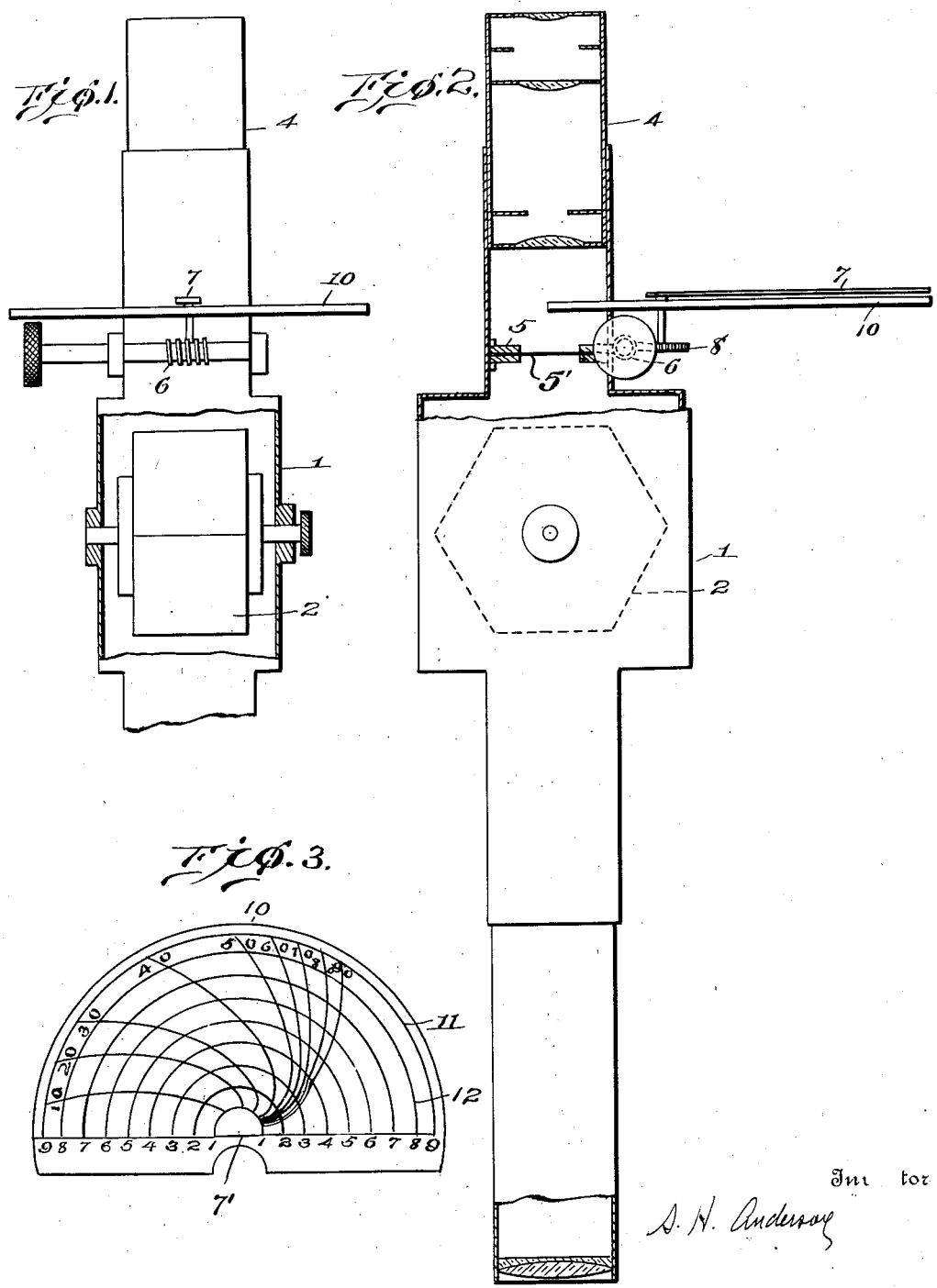

1,664,395

UNITED STATES PATENT OFFICE.

SAMUEL HERBERT ANDERSON, OF SEATTLE, WASHINGTON.

GROUND SPEED METER.

Application filed January 26, 1923. Serial No. 615,130.

This invention relates to ground speed indicators and more especially to such in which a revolving optical system is employed to produce an apparent ground velocity.

Heretofore in the art where rotating prisms were employed to produce a vectorial addition of velocities in a plane parallel to the direction and surface of travel it had been proposed to rotate the entire optical system other than the prism system to obtain an angular indication of the resultant drift produced in the field of the eyepiece. Reference is made in this connection to Patent 1,299,058, granted to C. A. Sundt.

As a consequence of the above method of construction a good deal of fineness of adjustment was lost. The present invention in contradistinction involves a method of attaching the pointer for indicating angularity not directly to the cross hair system which had heretofore been made integral with the telescopic tube but rather to an intermediate gearing meshing with the means for angularly displacing the variable cross hair with respect to a system of fixed cross hairs in the field of the eyepiece.

As a consequence of the above method of construction, it now becomes possible to obtain a broadened outscale for calibrating the angular movement of the pointer both with respect to altitude and resultant ground speed indicated.

In order more clearly to set forth the advantages and objects of the present invention the following drawings are attached in which:

Figure 1 represents a part sectional side view of the instrument;

Figure 2 corresponds to a part sectional view at right angles to Figure 1;

Figure 3 schematically represents the manner of laying out the three-variable scale for giving a direct reading.

In the device a fixed telescope body 1, is employed with the revoluble prism member 2, preferably arranged within the telescope body. Such prism is adapted to be driven in any well known manner to give the required constant speed of revolution. Between the objective 3 and the eyepiece 4 according to the invention there is mounted, first, a fixed cross hair system 4' relative to the telescope body 1 and secondly, there is provided a ring gear 5 revolubly mounted with respect to the telescope body or rather fixed cross hair system in such a manner that an external tangent screw 6 engages with the above ring gear which carries the variable set of cross hairs. The latter cross hairs are, therefore, disposed to revolve in the plane of the ring gear and preferably in close contiguity to the fixed cross hairs 5' which are mounted in the ring gear 5.

In order to actuate the pointer 7 a second gear 8 in mesh with the tangent screw 6 is provided which is so arranged that on the actuation of the tangent screw, manually or otherwise, the pointer is made to traverse an arc rather greater than the corresponding arc traversed by the ring gear 5 carrying the variable cross hairs 5'. The above magnification and simultaneous fineness of adjustment made possible by the above construction represents one of the principal advantages accruing to the present invention.

It will be understood that the prism 2 revolves at a constant speed on an axis longitudinal of the craft so as to cause an image of a sighted object to move laterally across the field of view from one side to the other, disappear at the side toward which it moves, and reappear again and repeat the action. The prism causes an artificial velocity of constant value and at a constant direction transverse of the aircraft. The travel of the aircraft forwardly actually is vectorially added to this artificial velocity to cause the apparent motion of objects to be at some angle to a transverse line and this angle is determined and registered by the pointer when the cross hairs 5 are aligned with the apparent motion.

With regard to the scale arrangement per se, in so far as it becomes necessary to correct for altitude at the same time as the variable cross hairs need to be radiated to follow the resultant or compounded direction of the stream line effect, a series of curves 9 are drawn on the scale 10. Such curves are made to correspond with a ground speed scale 11 for different values of the altitude indicated by the circular coordinates 12. Thus, where for a given altitude circle 12 the pointer 7 passing through the point 7' (see Figure 3) strikes the corresponding curve of the family of curves 11 there will be automatically selected one of such family of curves 11, which will give the proper coordinate value of the actual ground speed.

In operation, therefore, on looking through the eyepiece 4 the tangent screw 6 is so varied till coincidence of the variable cross hairs with the resultant stream line is effected. The needle 7 with respect to the scale 10 will then give the proper indication of the ground speed for the previously known altitude.

Having disclosed the nature of my invention what I claim is:

1. A ground speed indicator comprising a scale and mounting therefor, a revoluble cross hair gear device on said mounting, and a pointer gear device, on said mounting for cooperation with said scale and an adjusting tangent screw means in mesh with both said gear devices, said scale including altitude and ground speed coordinates for variable settings of said pointer device.

2. A ground speed indicator comprising a telescope body having a ring gear carrying cross hairs revolubly mounted therein, a pointer having a gear thereon and actuating means including a worm means in mesh with said ring gear and said second mentioned gear.

In testimony whereof I affix my signature.

SAMUEL HERBERT ANDERSON.